United States Patent Office 3,773,778
Patented Nov. 20, 1973

3,773,778
SULFUR DERIVATIVES OF PYRAZOLO [3,4-b]PYRIDINES
Hans Hoehn, Tegernheim, and Theodor Denzel, Nuremberg, Germany, assignors to E. R. Squibb & Sons, Inc., Princeton, N.J.
No Drawing. Filed Jan. 24, 1972, Ser. No. 220,373
Int. Cl. C07d 31/50
U.S. Cl. 260—294.8 C        8 Claims

ABSTRACT OF THE DISCLOSURE

New sulfur derivatives of pyrazolo[3,4-b]pyridines having the general formula

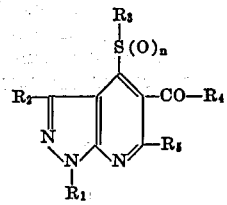

and also their salts, are useful as central nervous system depressants. These compounds also increase the intracellular concentration of adenosine-3′,5-cyclic monophosphate.

SUMMARY OF THE INVENTION

This invention relates to new pyrazolo[3,4-b]pyridines, and salts thereof. These new compounds have the general formula (I)

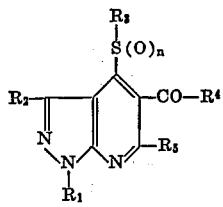

The symbols have the following meanings in Formula I and throughout this specification: $R_1$ represents hydrogen, lower alkyl, phenyl, phenyl-lower alkyl or cyclolower alkyl, $R_2$ represents hydrogen, lower alkyl or phenly, $R_3$ represents hydrogen (only when n is 0), lower alkyl, phenyl, phenyl-lower alkyl or a nitrogen heterocyclic, $R_4$ repersents hydroxy, lower alkoxy, lower alkyl, phenyl or an acyclic or heterocyclic amine radical. $R_5$ represents hydrogen, lower alkyl or phenyl. n is 0, 1 or 2.

Preferred compounds of Formula I are those in which $R_1$ is hydrogen or lower alkyl, especially ethyl, $R_2$ is hydrogen or methyl, $R_3$ is hydrogen or lower alkyl, especially methyl or ethyl, phenyl or heterocyclic, especially imidazole, n is 0 or two, $R_4$ is hydroxy, lower alkoxy, especially ethoxy, lower alkyl especially, methyl, phenyl or lower-alkylamino, $R_5$ is hydrogen or methyl.

DETAILED DESCRIPTION OF THE INVENTION

The various groups referred to above are of the following types: the lower alkyl groups include straight or branched chain hydrocarbon groups of up to 7 carbon atoms like methyl, ethyl, propyl, isopropyl, butyl, amyl, hexyl and the like, methyl, ethyl, propyl and butyl being preferred. The lower alkoxy groups and hydroxy-lower alkyl groups (referred to below) similarly include such alkyl groups linked to an oxygen atom or hydroxy group, respectively, e.g., methoxy, propoxy, ethoxy, isopropoxy, hydroxymethyl, hydroxyethyl and the like. The cycloalkyl groups are 3- to 6-carbon alicyclics including cyclopropyl, cyclobutyl, cyclopentyl or cyclohexyl, the last two being preferred.

The nitrogen heterocyclics represented by $R_3$ are 5- or 6-membered monocyclic nitrogen heterocyclics in which there are (exclusive of hydrogen) one or two nitrogen atoms, one nitrogen atom and one sulfur or one oxygen atom, the remaining being carbon. These include, for example, imidazolyl (which is preferred), piperidyl, pyrrolidyl, morpholinyl, thiamorpholinyl, or piperazinyl. These heterocyclics may also bear a lower alkyl, lower alkoxy or hydroxy-lower alkyl group.

$R_4$ may form an amide radical with the carbonyl group. In this instance $R_4$ represents the basic nitrogen containing radical

(II)

in which, $R_6$ and $R_7$ each represents hydrogen, lower alkyl or hydroxy-lower alkyl forming such basic groups as amino, lower alkylamino, e.g., methylamino, ethylamino, isopropylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino.

In addition the nitrogen may join with the groups represented by $R_6$ and $R_7$ to form a 5- or 6-membered monocyclic heterocyclic similar to those described above, containing, if desired, an oxygen, sulfur or an additional nitrogen atom, (not more than two hetero atoms altogether) e.g., piperidino, pyrrolidino, morpholino, thiamorpholino or piperazino. These heterocyclic groups may also bear a lower alkyl, lower alkoxy or hydroxy-lower alkyl group.

Representative heterocyclic groups include, for example, piperidino, 2-, 3- or 4-(lower alkoxy)piperidino, e.g., 2-methoxypiperidino, 2-, 3- or 4-(lower alkyl)piperidino, e.g., 2-, 3- or 4-methylpiperidino, pyrrolidino, (lower alkyl)pyrrolidino, e.g., 2-methylpyrrolidino, (lower alkoxy) pyrrolidino, e.g., 2-ethoxypyrrolidino, lower alkyl pyrrolidino, e.g., 2-methylpyrrolidino, morpholino, (lower alkyl) morpholino, e.g., 3-methylmorpholino or 2-methylmorpholino, (lower alkoxy)morpholino, e.g., 2-ethoxymorpholino, thiamorpholino, (lower alkyl)thiamorpholino, e.g., 3-methylthiamorpholino or 2-methylthiamorpholino, (lower alkoxy)thiamorpholino, e.g., 2-methoxythiamorpholino, piperazino, (lower alkyl) piperazino, e.g., 4-methylpiperazino, 2-methylpiperazino or (hydroxy-lower alkyl)piperazino, e.g., 4-(2-hydroxyethyl)piperazino.

The new compounds of Formula I are formed by the following series of reactions. The symbols in the structural formulas have the same meaning as previously described.

To produce a compound of Formula I wherein $R_1$ is other than hydrogen and $R_4$ is hydroxy, lower alkoxy, lower alkyl or phenyl, a 5-aminopyrazole of the formula (III) 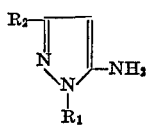

[produced analogous to the procedure, described in Z. f. Chemie 10 386 (1970)] is made to react with a compound of the formula (IV) 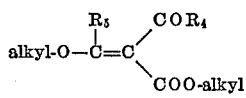

by heating at a temperature of about 120–130° C.
The resulting compound of formula (V) 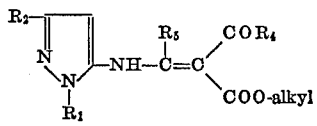

is cyclized in an inert organic solvent such as diphenyl ether at about 230° to about 260° C. while distilling off the alcohol formed, producing a compound of formula (VI) 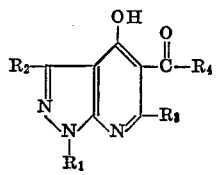

This 4-hydroxy compound is refluxed for several hours with a phosphorous halide like phosphorous oxychloride to obtain the intermediate of formula (VII) 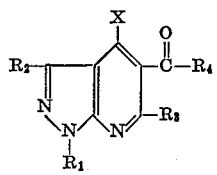

wherein X is chlorine or bromine.

Alternatively, instead of cyclizing the compound of Formula V in an inert organic solvent at about 230 to 260° as described above, this product also undergoes cyclization by treatment with a phosphorous halide like phosphorous oxychloride producing directly the intermediate of Formula VII.

The products of Formula I are then prepared from compounds of Formula VII by reaction with a mercaptan of the formula (VIII)    $R_3$—SH In order to obtain sulfur compounds of Formula I in which $n$ represents 1 or 2 an oxidation reaction has to follow. This may be effected with the foregoing product at room or elevated temperatures by use of an oxidizing agent such as air, hydrogen peroxide, potassium permanganate or the like. The oxidation is effected in aqueous or acetic acid solution with longer periods or more severe conditions favoring the higher state of oxidation.

In order to obtain a product of Formula I wherein $R_4$ is an acyclic amine or nitrogen heterocyclic, the product of the reaction of the compound of Formula VII with a mercaptan of Formula VIII, i.e., a compound of the formula (IX) 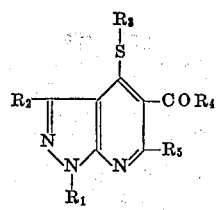

wherein $R_4$ is lower alkoxy, is hydrolyzed, e.g., with aqueous sodium hydroxide, to obtain the corresponding compound wherein $R_4$ is hydroxy. This is then processed, in a manner analogous to that described in the copending application of Hans Hoehn and Jack Bernstein, Ser. No. 195,808, filed Nov. 4, 1971, converting it by means of thionyl chloride or a phosphorous halide like the bromide or chloride to a compound of the formula (X) 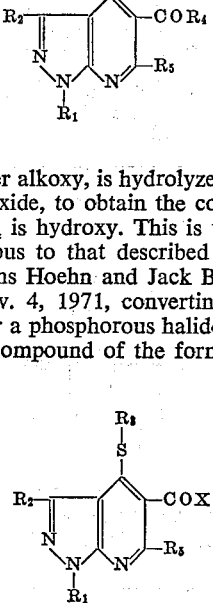

wherein X is chlorine or bromine. Reaction of a compound of Formula X with an amine of the formula (XI) 

at room temperature or below in a hydrocarbon solvent like benzene provides the desired amide.

In order to obtain a product of Formula I wherein $R_1$ is hydrogen a modification of the foregoing procedure is required. According to this modification, a 5-aminopyrazole of Formula III is used, wherein $R_1$ is an arylmethyl group or a heteromethyl group. This starting material has the formula (IIIa) 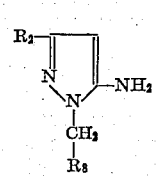

wherein $R_8$ is an aromatic or heterocyclic nucleus like phenyl, naphthyl, furyl, pyridyl, pyrimidyl, pyrazinyl or the like. Furyl and pyridyl are preferred.

This starting material is processed as described above through the reaction with a compound of Formula IV and cyclization of the product corresponding to Formula V to obtain a compound of Formula VI.

At this point, the compound of Formula VI, having the —$CH_2$—$R_8$ substituent of Formula IIIa in the 1-position, is oxidized with a metal oxide oxidizing agent like selenium dioxide in a high boilng solvent lke diethyleneglycol dimethylether at about 160° C. This yields a compound of Formula VI, wherein $R_1$ is hydrogen. Subsequently, this intermediate is converted, as described above, to the 4-halo compound of Formula VII by means of phosphorous oxychloride, which in turn is treated with the mercapto compound of Formula VIII and, oxidized or otherwise processed as described above.

The compounds of Formula I form salts which are also part of this invention. The salts include acid-addition salts, particularly the non-toxic, physiologically acceptable members. The bases of Formula I form salts by reaction with a variety of inorganic and organic acids providing acid addition salts including, for example, hydrohalides (especially hydrochloride and hydrobromide), sulfate, nitrate, borate, phosphate, oxalate, tartrate, maleate, citrate, acetate, ascorbate, succinate, benzenesulfonate, methanesulfonate, cyclohexanesulfamate, toluenesulfonate and the like. The acid addition salts frequently provide a convenient means for isolating the product e.g., by forming and precipitating the salt in a medium in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlorodiazepoxide. For this purpose a compound or mixture of compounds of Formula I or non-toxic, physiolgically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-monophosphate, and thus by the administration of about 1 to 100 mg./kg./day, preferably about 10 to 50 mg./kg., in single or two to four divided doses, in conventional dosage forms such as those described above, may be used to alleviate the symptoms of asthma.

The following examples are illustrative of the invention and constitute preferred embodiments. All temperatures are on the centigrade scale.

EXAMPLE 1

1-ethyl-4-ethylmercapto-1H-pyrazolo[3,4-b]pyridine-5-carboxylic acid ethyl ester (a) [[(1 - ethyl - 5 - pyrazolyl)amino]methylene] malonic acid diethyl ester.—245 g. of 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (B.P. $_{0.1}$ 154–160°) yields 520 g. (84% of theory) of a quickly crystallizing oil, [[(1-ethyl - 5 - pyrazolyl)amino]methylene]malonic acid diethyl ester, M.P. 50–53°.

The compound is recrystallized from n-hexane, M.P. 55–57°.

The hydrochloride salt is formed by treating the above product with dilute ethanolic hydrogen chloride solution.

(b) 1-ethyl-4-hydroxy-1H - pyrazolo[3,4 - b]pyridine-5-carboxylic acid and ethyl ester.—253 g. of [[(1-ethyl-5-pyrazolyl)amino]methylene]malonic acid diethyl ester (0.09 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b] - pyridine - 5 - carboxylic acid ethyl ester is obtained at B.P. $_{0.05}$ 115–120°, yield 195 g.=92% of theory, M.P. 85–87°. The compound is recrystallized from benzene (90 to 100°), M.P. 87–89°. Hydrolysis of this product with aqueous sodium hydroxide yields 1-ethyl-4-hydroxy - 1H - pyrazolo[3,4-b] pyridine-5-carboxylic acid, M.P. 201–202°.

(c) 4-chloro-1-ethyl-1H - pyrazolo[3,4 - b]pyridine - 5-carboxylic acid ethyl ester.—A mixture of 23.5 of 1-ethyl-4 - hydroxy - 1H - pyrazolo[3,4 - b]pyridine-5-carboxylic acid ethyl ester (0.1 mol.) and 150 ml. of phosphorous oxychloride is refluxed for 4 hours. Subsequently the excess phosphorous oxychloride is removed by means of vacuum distillation. As soon as the phosphorous oxychloride has been removed, the oily residue solidifies on cooling. It is treated with water and filtered under suction (24.5 g.), M.P. 55–60°. The 4-chloro-1-ethyl-1H-pyrazolo[3,4 - b]pyridine - 5 - carboxylic acid ethyl ester is recrystallized from n-hexane (22.5 g. =87%), M.P. 62°.

(d) 1-ethyl-4-ethylmercapto - 1H - pyrazolo[3,4 - b] pyridine-5-carboxylic acid ethyl ester.—In a solution of 2.5 g. of ethylmercaptan (0.01 mol.) in 20 ml. of benzene, 0.25 g. of sodium (0.011 mol.) is introduced. The reaction mixture is stirred for 3 hours at room temperature and upon standing overnight 2.5 g. of 4-chloro-1-ethyl-1H-pyrazolo[3,4-b]pyridine-5-carboxylic acid ethyl ester (0.01 mol.) are added. The clear solution is heated at 55–60° for 1½ hours. After cooling, the separated sodium chloride is filtered off under suction and the filtrate is evaporated in vacuo. The oily residue crystallizes on cooling and is recrystallized from n-hexane. The yield of 1-ethyl-4-ethylmercapto - 1H - pyrazolo[3,4 - b]pyridine-5-carboxylic acid ethyl ester amounts to 2.4 g.=86%, M.P. 65–66°.

EXAMPLE 2

1-1-ethyl-3-methyl-4-(methylsulfonyl)-1H-pyrazolo-[3,4-b]pyridine-5-carboxylic acid ethyl ester (a) [[(1-ethyl-3-methyl-5 - pyrazolyl)amino]methylene]malonic acid diethyl ester.—12.5 g. of 1-ethyl-3-methyl-5-aminopyrazole (0.1 mol.) and 21.6 g. of ethoxymethylene malonic acid diethyl ester (0.1 mol.) are heated to 120° (bath temperature) for 2 hours with stirring. The ethanol formed by this reaction is removed by means of a water aspirator. Then vacuum distillation (B.P. $_{0.05}$ 152–153°) yields 24.0 g. (81.5% of theory) of a quickly crystallizing oil [[(1-ethyl-3-methyl - 5 - pyrazolyl)amino]methylene]malonic acid diethyl ester, M.P. 60–67°. The product, recrystallized from benzene (90–100°), melts at 69–70°.

(b) 1-ethyl-4-hydroxy - 3 - methyl-1H-pyrazolo[3,4-b] pyridine-5-carboxylic acid ethyl ester.—14.8 g. of [[(1-ethyl-3-methyl - 5 - pyrazolyl)amino]methylene]-malonic acid diethyl ester (0.05 mol.) are dissolved in 50 g. of diphenyl ether. The reaction mixture is heated to 235–250° (bath temperature) and allowed to react at this temperature for 1 to 2 hours, while the resulting ethanol is continuously distilled off. The last part of the alcohol is removed by means of a water aspirator. The diphenyl ether is separated by distillation with a fractionating column in vacuo. The 1-ethyl-4-hydroxy-3-methyl-1H-pyrazolo[3,4-b]pyridine-5-carboxylic acid ethyl ester is obtained at B.P. $_{0.1-0.5}$ 125–129°, yield 10.7 g.=86% of theory, M.P. 91–93°. The compound is recrystallized from benzene (90–100°), M.P. 93–94°.

(c) 4-chloro - 1 - ethyl-3-methyl-1H-pyrazolo[3,4-b]pyridine-5-carboxylic acid ethyl ester.—By substituting an equivalent amount of 1 - ethyl-4-hydroxy-3-methyl-1H-pyrazolo[3,4-b]pyridine-5-carboxylic acid ester for the 1-ethyl-4-hydroxy - 1H - pyrazolo[3,4-b]pyridine-5-carboxylic acid ethyl ester in the procedure of Example 1c, 4-chloro-1-ethyl-3-methyl - 1H - pyrazolo[3,4-b]pyridine-5-carboxylic acid ethyl ester, M.P. 78–80°, is obtained.

(d) 1-ethyl - 3 - methyl-4-(methylsulfonyl)-1H-pyrazolo[3,4 - b]pyridine-5-carboxlic acid ethyl ester.—By treating 10.6 g. of 4-chloro-1-ethyl-3-methyl-1H-pyrazolo-[3,4-b]pyridine-5-carboxylic acid ethyl ester (0.04 mol.) with sodium methylmercaptan (0.044 mol.) in 75 ml. of absolute alcohol for five hours at room temperature and working up the product as in Example 1d, 1-ethyl-3-methyl-4-methylmercapto - 1H - pyrazolo[3,4-b]pyridine-5-carboxylic acid ethyl ester (6.8 g., oil) is obtained. After exposure to air, 5.9 g. of 1-ethyl-3-methyl-4-(methylsulfonyl)-1H-pyrazolo[3,4-b]pyridine - 5 - carboxylic acid ethyl ester are obtained, recrystallized from cyclohexane, M.P. 92–94°.

EXAMPLE 3

1-ethyl-4-[(1-methyl-2-imidazolyl)thio]-1H-pyrazolo-[3,4-b]pyridine-5-carboxylic acid ethyl ester (a) 4-chloro - 1 - ethyl-1H-pyrazolo[3,4-b]pyridine-5-carboxylic acid ethyl ester.—A mixture of 12 g. of [[(1-ethyl-5-pyrazolyl)amino]-methylene]malonic acid diethyl ester (0.043 mol.) and 70 ml. of phosphorous oxychloride is refluxed for 15 hours. Subsequently, the excess phosphorous oxychloride is removed in vacuo and the oily residue is treated with 50 ml. of water. The oil then becomes crystalline. The solid material is filtered under suction and dried in a desiccator, yield 8.5 g.=79% of theory. The 4-chloro - 1 - ethyl-1H-pyyrazolo[3,4-b]pyridine-5-carboxylic acid ethyl ester is recrystallized from n-hexane, M.P. 62°.

(b) 1-ethyl-4-[(1-methyl - 2 - imidazolyl)thio]-1H-pyrazolo[3,4-b]pyridine-5-carboxylic acid and ethyl ester.— In a solution of 2.5 g. of sodium (0.11 mol.) in 100 ml. of absolute ethanol, 11.5 g. of 2-mercapto-1-methylimidazole (0.1 mol.) are introduced and the whole is stirred for 20 minutes. Then a solution of 25.3 g. of 4-chloro-1-ethyl-1H-pyrazolo[3,4-b]pyridine - 5 - carboxylic acid ethyl ester in 50 ml. of absolute alcohol is added and the reaction mixture is heated for 3 hours at 50°. Upon standing overnight, the precipitate is filtered under suction, washed with water in order to dissolve sodium chloride and then dried (19 g.). An additional 4 g. of 1-ethyl-4-[(1-ethyl - 2 - imidazolyl)thio]-1H-pyrazolo[3,4-b]pyridine-5-carboxylic acid ethyl ester is obtained by evaporating the mother liquor; total yield=69%, M.P. 144–146°. The compound is recrystallized from alcohol, M.P. 145–146°.

3.3 g. of 1-ethyl-4-[(1-methyl-2-imidazolyl)thio]-1H-pyrazolo[3,4-b]pyridine - 5 - carboxylic acid ethyl ester (0.01 mol.), saponified by means of 40 ml. of 5% sodium hydroxide solution of 8 hours at room temperature, provides upon saponification and acidification of the solution with acetic acid 2.8 g. of 1-ethyl-4-[(1-methyl-2-imidazolyl)thio]-1H-pyrazolo[3,4 - b]pyridine - 5 - carboxylic acid, M.P. 220–224°, recrystallization from alcohol, M.P. 222–224°.

EXAMPLE 4

1-ethyl-4-mercapto-1H-pyrazolo[3,4-b]pyridine-5-carboxylic acid ethyl ester

By treating the 4 - chloro-1-ethyl-1H-pyrazolo[3,4-b]pyridine-5-carboxylic acid ethyl ester of Example 3a with sodium hydrosulfide as in Example 2d, 1 - ethyl-4-mercapto-1H-pyrazolo[3,4-b]pyridine-5-carboxylic acid ethyl ester is obtained, M.P. 109–110°.

EXAMPLE 5

1-ethyl-4-phenylmercapto-1H-pyrazolo[3,4-b]pyridine-5-carboxylic acid (a) 1-ethyl-4-phenylmercapto-1H-pyrazolo[3,4-b]pyridine-5-carboxylic acid ethyl ester.—12.7 g. of 4-chloro-1-ethyl-1H-pyrazolo[3,4-b]pyridine - 5 - carboxylic acid ethyl ester (0.05 mol.) are dissolved in 50 ml. of anhydrous alcohol and treated with 7.5 g. of potassium thiophenolate for 5 hours at 80°. After this time the precipitated potassium chloride is filtered off and the solvent removed in vacuo. The residue, recrystallized from hexane, yields 13.2 g. of 1-ethyl-4-phenylmercapto-1H-pyrazolo-[3,4 - b]pyridine-5-carboxylic acid ethyl ester (80%), M.P. 68°.

(b) 1-ethyl - 4 - phenylmercapto-1H-pyrazolo[3,4-b]pyridine-5-carboxylic acid.—32.7 g. of 1-ethyl-4-phenylmercapto-1H-pyrazolo[3,4 - b]pyridine-5-carboxylic acid ethyl ester (0.1 mol.) are treated with 10 g. of potassium hydroxide in 100 ml. of alcohol for 12 hours at 60–70°. The solvent is evaporated to dryness and the residue dissolved in 50 ml. of water. After acidifying the clear solution with acetic acid, 1-ethyl-4-phenylmercapto-1H-pyrazolo[3,4-b]pyridine-5-carboxylic acid precipitates and is filtered off. Recrystallization from acetic acid yields 25 g. (84%), M.P. 248°.

EXAMPLE 6

1-ethyl-4-ethylmercapto-1H-pyrazolo[3,4-b]pyridine-5-N-butylcarboxamide (a) 1-ethyl - 4 - ethylmercapto-1H-pyrazolo[3,4-b]pyridine-5-carboxylic acid.—Hydrolysis of 1-ethyl-4-ethylmercapto-1H-pyrazolo[3,4-b]pyridine-5-carboxylic acid ethyl ester from Example 1d with aqueous sodium hydroxide at room temperature and stirring yields after acidification 1-ethyl-4-ethylmercapto - 1H - pyrazolo[3,4-b]pyridine-5-carboxylic acid.

(b) 1-ethyl - 4 - ethylmercapto-1H-pyrazolo[3,4-b]pyridine-5-carboxylic acid chloride.—26.5 g. of 1-ethyl-4-ethylmercapto-1H-pyrazolo[3,4-b]pyridine-5-carboxylic acid and 150 ml. of thionyl chloride are refluxed for 7 hours. Subsequently, the thionyl chloride is removed by means of a water aspirator. The residue, contains the crude 1-ethyl - 4 - ethylmercapto-1H-pyrazolo[3,4-b]pyridine-5-carboxylic acid chloride, which can be used without further purification for the reaction step.

(e) 1-ethyl - 4 - ethylmercapto-1H-pyrazolo[3,4-b]pyridine-5-N-butylcarboxamide.—To 7.5 g. of 1-ethyl-4-ethylmercapto-1H-pyrazolo[3,4-b]pyridine - 5 - carboxylic acid chloride suspended in 60 ml. of benzene are added slowly 4.4 g. of butylamine. After a short time the starting material dissolves and the solution becomes temporarily clear. Upon standing at room temperature for 24 hours, a precipitate forms which consists of butylamine hydrochloride as well as 1-ethyl-4-ethylmercapto-1H-pyrazolo-[3,4-b]pyridine-5-N-butylcarboxamide. The precipitate is filtered under suction and washed with water in order to dissolve the butylamine hydrochloride. There remains 1-ethyl - 4 - ethylmercapto-1H-pyrazolo[3,4-b]pyridine-5-N-butylcarboxamide.

The following compounds are prepared by the procedure of Example 1, 2, 3 or 6 by substituting the appropriately substituted 4-chloro-1H-pyrazolo[3,4-d]pyridine-5- carboxylic acid ethyl ester, the appropriate mercaptan and amine:

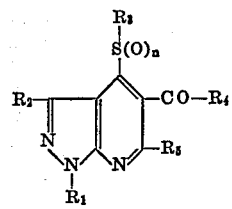

| Example | $R_1$ | $R_2$ | $R_3$ | $n$ | $R_4$ | $R_5$ |
|---|---|---|---|---|---|---|
| 7 | H | H | $CH_3-CH_2-$ | 0 | $-OC_2H_5$ | H |
| 8 | $C_6H_5-$ | H | $CH_3-CH_2-$ | 2 | $-OC_2H_5$ | H |
| 9 | $C_6H_5-CH_2-$ | $CH_3-$ | $CH_3-$ | 2 | $-OC_2H_5$ | H |
| 10 | thienyl | $CH_3-$ | $CH_3-CH_2-$ | 0 | $-OC_2H_5$ | H |
| 11 | $CH_3-CH_2-$ | H | $CH_3-CH_2$ | 0 | $-OC_2H_5$ | $CH_3-$ |
| 12 | $CH_3-$ | $CH_3-$ | $CH_3-(CH_2)_3-$ | 0 | $-OC_2H_5$ | $CH_3$ |
| 13 | $CH_3-CH_2-$ | $C_6H_5-$ | $CH_3-(CH_2)_3-$ | 2 | $-OC_2H_5$ | H |
| 14 | $CH_3-$ | $CH_3-$ | $C_6H_5-$ | 1 | $-OC_2H_5$ | H |
| 15 | $CH_3-(CH_2)_3-$ | H | $C_6H_5-CH_2-$ | 2 | $-OC_2H_5$ | H |
| 16 | $CH_3-(CH_2)_3-$ | $CH_3-$ | $CH_3-CH_2-$ | 0 | $-OC_2H_5$ | $CH_3-$ |
| 17 | $CH_3-CH_2-$ | H | $(CH_3)_2CH-$ | 0 | $-OC_2H_5$ | $C_6H_5-$ |
| 18 | $CH_2-CH_3-$ | H | $CH_3-CH_2$ | 0 | $-NH_2$ | H |
| 19 | H | $CH_3-$ | $CH_3-(CH_2)_3-$ | 0 | $-NHC_4H_9$ | $C_6H_5-$ |
| 20 | $(CH_3)_2CH$ | H | $CH_3-CH_2$ | 0 | $-N(C_2H_5)_2$ | H |
| 21 | $C_6H_5-$ | $CH_3-$ | $CH_3$ | 2 | $-N(C_2H_5)_2$ | $CH_3$ |

EXAMPLE 22

5-acetyl-4-butylmercapto-1-ethyl-1H-pyrazolo[3,4-b]pyridine (a) (1-ethyl - 5 - pyrazolyl)aminomethylene acetoacetic acid ethyl ester.—222 g. of 1-ethyl-5-aminopyrazole (2 mol.) and 372 g. of ethoxymethylene acetoacetic acid ethyl ester (2 mol.) are heated together at 120–130°, with stirring, until the theoretical amount of alcohol is distilled off. Cooling and recrystallization from methanol yields 375 g. of (1-ethyl-5-pyrazolyl)aminoethylene acetoacetic acid ethyl ester (75%), M.P. 53–55°.

(b) 5-acetyl - 1 - ethyl-4-hydroxy-1H-pyrazolo[3,4-b] pyridine.—300 g. of (1-ethyl-5-pyrazolyl)aminomethylene acetoacetic acid ethyl ester (1.2 mol.) are placed into a flask which is heated in an oil bath for 5 minutes at 260° while the alcohol formed is distilled off. After this time, the flask is cooled as rapidly as possible. The residue is recrystallized from methanol and yields 148 g. of 5-acetyl-1-ethyl - 4 - hydroxy-1H-pyrazolo[3,4-b]pyridine (60%), M.P. 155–157°.

(c) 5-acetyl - 4 - chloro-1-ethyl-1H-pyrazolo[3,4-b]pyridine.—20.5 g. of 5-acetyl-1-ethyl-4-hydroxy-1H-pyrazolo-[3,4-b]pyridine (0.1 mol.) are treated with 50 ml. of phosphorus oxychloride at 60° for 12 hours. The excess of phosphorus oxychloride is removed in vacuo and the residue is poured onto ice. 5-acetyl-4-chloro-1-ethyl-1H-pyrazolo[3,4-b]pyridine separates and is recrystallized from petroleum ether, yield 14.5 g. (65%), M.P. 55°.

(d) 5-acetyl-4-butylmercapto - 1 - ethyl-1H-pyrazolo-[3,4-b]pyridine.—11.2 g. of 5-acetyl-4-chloro-1-ethyl-pyrazolo[3,4-b]pyridine (0.05 mol.) are treated together with a suspension of sodium butylmercaptide in anhydrous dioxane (prepared from 4.5 g. of butyl mercaptan and 1.2 g. of sodium hydride in 50 ml. dioxane) for 2 hours. After this time, sodium chloride separates and is filtered off. The residue is evaporated to dryness, and recrystallized from hexane, yield 11.2 g. of 5-acetyl-4-butyl-mercapto-1-ethyl-1H-pyrazolo[3,4-b]pyridine (81%), M.P. 65°.

EXAMPLE 23

5-benzoyl-1-ethyl-4-phenylmercapto-1H-pyrazolo[3,4-b]pyridine (a) 5-benzoyl - 1 - ethyl-4-hydroxy-1H-pyrazolo[3,4-b]pyridine.—222 g. of 5-amino-1-ethylpyrazole (2 mol.) and 496 g. of ethoxymethylenebenzoylacetic acid ethyl ester (2 mol.) are heated with stirring to about 140°, until no more alcohol distills. The temperature is then raised to 240°. The alcohol formed is distilled off in vacuo. After about one hour, the reaction is complete, the residue is cooled to room temperature and 500 ml. of methanol are added. 5-benzyl-1-ethyl - 4 - hydroxy-1H-pyrazolo[3,4-b]pyridine crystallizes and is filtered off, yield 360 g. (67%), M.P. 151°.

(b) 5-benzoyl - 4 - chloro-1-ethyl-1H-pyrazolo[3,4-b]pyridine.—53.5 g. of 5-benzoyl - 1 - ethyl-4-hydroxy-1H-pyrazolo[3,4-b]pyridine (0.02 mol.) and 150 ml. of phosphorus oxychloride are refluxed at 150° for 5 hours. The excess phosphorus halide is removed in vacuo and the residue is neutralized with saturated sodium bicarbonate solution. The pale yellow crystals of 5-benzoyl-4-chloro-1- ethyl-1H-pyrazolo[3,4-b]pyridine are filtered off and recrystallized from ethyl acetate, yield 35 g. (61%), M.P. 140°.

(c) 5-benzoyl - 1 - ethyl-4-phenylmercapto-1H-pyrazolo[3,4-b]pyridine.—14.2 g. of 5-benzoyl-4-chloro-1-ethyl-1H-pyrazolo[3,4-b]pyridine (0.05 mol.) are treated in alcohol with 7.5 g. of potassium thiophenolate at reflux temperature for 3 hours. The precipitated potassium chloride is filtered off and the solvent is removed in vacuo. Recrystallization of the residue from ethyl acetate yields 15 g. of 5-benzoyl-1-ethyl-4-phenylmercapto-1H-pyrazolo-[3,4-b]pyridine (83%), M.P. 92–95°.

EXAMPLE 24

4-butylmercapto-5-benzoyl-1-ethyl-1H-pyrazolo [3,4-b]pyridine 28.5 g. of 5-benzoyl-1-ethyl-4-chloro-1H-pyrazolo[3,4-b]pyridine (0.1 mol.) are added to a suspension of 11.2 g. of sodium butylmercaptide in 50 ml. of anhydrous dioxane. The mixture is heated for 5 hours at 70°. After this time, the precipitated sodium chloride is filtered off, dioxane is removed in vacuo and the residue recrystallized from hexane, yield 28 g. of 4-butylmercapto-5-benzoyl-1-ethyl-1H-pyrazolo[3,4-b]pyridine (82%), M.P. 49–51°.

The following compounds are prepared by the procedure of Examples 22, 23 or 24 by substituting the appropriately substituted 5-acyl-4-chloro-1H-pyrazolo[3,4-b]pyridine and the appropriate mercaptan.

added. 4-hydroxy-1-(4-picolyl)-1H-pyrazolo[3,4-b]pyridine-5-carboxylic acid ethyl ester crystallizes on standing, yield 33 g. (44%), M.P. 140°.

(c) 4 - hydroxy - 1H - pyrazolo[3,4 - b]pyridine - 5-carboxylic acid ethyl ester.—3 g. of 4-hydroxy-1-(4-picolyl)-1H-pyrazolo[3,4-b]pyridine-5-carboxylic acid ethyl ester (0.01 mol.) are dissolved in 20 ml. of acetic acid. 2.2 g. of selenium dioxide (0.02 mol.) and 2–3 drops of water are added. The mixture is refluxed for 30 minutes and then filtered off. 4-hydroxy-1H-pyrazolo[3,4-b]pyridine-5-carboxylic acid ethyl ester precipitates on cooling. Recrystallization from acetic acid yields 1.8 g. (87%), M.P. 275°.

(d) 4 - chloro - 1H - pyrazolo[3,4-b]pyridine - 5 - carboxylic acid ethyl ester.—4-hydroxy-1H-pyrazolo[3,4-b]pyridine-5-carboxylic acid ethyl ester is treated with phosphorus oxychloride as in Example 1c to obtain 4-chloro-1H-pyrazolo[3,4-b]pyridine-5-carboxylic acid ethyl ester.

(e) 4 - ethylmercapto - 1H - pyrazolo[3,4 - b]pyridine-5-carboxylic acid ethyl ester.—4-chloro-1H-pyrazolo[3,4-b]pyridine-5-carboxylic acid ethyl ester is treated with ethylmercaptan as in Example 1d to obtain 4-ethylmercapto-1H-pyrazolo[3,4-b]pyridine-5-carboxylic acid ethyl ester.

(f) 4 - ethylmercapto - 1H - pyrazolo[3,4-b]pyridine-5-carboxylic acid.—5.7 g. of 4-ethylmercapto-1H-pyrazolo[3,4-b]pyridine-5-carboxylic acid ethyl ester are treated with a solution of 2.3 g. of potassium hydroxide in 20 ml. of alcohol for 12 hours at 50°. The solvent is

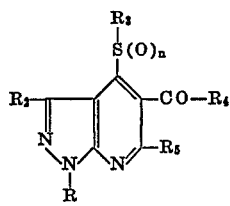

| Ex. | $R_1$ | $R_2$ | $R_3$ | $n$ | $R_4$ | $R_5$ |
|---|---|---|---|---|---|---|
| 25 | $CH_3$ | $CH_3$ | $CH_3-CH_3$ | 0 | $CH_3-CH_2-$ | H |
| 26 | $CH_3-CH_3$ | H | $CH_3$ | 2 | $CH_3-CH_2-CH_2-$ | H |
| 27 | $CH_3-(CH_2)_3-$ | H | ⟨phenyl⟩ | 1 | $CH_3$ | H |
| 28 | H | H | $CH_3-CH_3$ | 0 | $CH_3-CH_3$ | H |
| 29 | ⟨phenyl⟩ | $CH_3$ | $CH_3-(CH_2)_3-$ | 0 | ⟨phenyl⟩ | H |
| 30 | ⟨phenyl⟩$-CH_3$ | $CH_3$ | $(CH_3)_2CH-$ | 2 | $CH_3$ | $CH_3$ |
| 31 | $CH_3-CH_3$ | ⟨phenyl⟩ | $CH_3-CH_3-$ | 0 | $CH_3-CH_2-CH_2-CH_2-$ | H |
| 32 | $CH_3-CH_3$ | H | $CH_3$ | 2 | $CH_3$ | ⟨phenyl⟩ |

EXAMPLE 33

4-ethylmercapto-1H-pyrazolo[3,4-b]pyridine-5-N-butylcarboxamide (a) [[[1 - (4 - picolyl) - 5 - pyrazolyl]amino]methylene]malonic acid diethyl ester.—174 g. of 1-(4-picoly)-5-aminopyrazole and 216 g. of ethoxymethylene malonic acid diethyl ester are heated with stirring at 140°, until the theoretical amount of alcohol has distilled off. The reaction mixture crystallizes on cooling. Recrystallization from ethyl acetate yields 220 g. of [[[1-(4-picolyl)-5-pyrazolyl] amino]methylene]malonic acid diethyl ester (65%), MP.. 95–97°.

(b) 4-hydroxy - 1 - (4 - picolyl) - 1H - pyrazolo[3,4-b]pyridine-5-carboxylic acid ethyl ester.—86 g. of [[[1-(4-picolyl) - 5 - pyrazolyl]amino]methylene]malonic acid diethyl ester (0.25 mol.) are heated at 240° for 15 minutes. The dark oil is cooled and 200 ml. of methanol are distilled off, the residue is dissolved in 20 ml. of water and acidified with some acetic acid. 4-ethylmercapto-1H-pyrazolo[3,4-b]pyridine-5-carboxylic acid solidifies and is recrystallized.

(g) 4 - ethylmercapto - 1H - pyrazolo[3,4-b]pyridine-5-N-butylcarboxamide.—2.1 g. of 4-ethylmercapto-1H-pyrazolo[3,4-b]pyridine-5-carboxylic acid is refluxed with 10 ml. of thionyl chloride for 5 hours. After this time, the excess thionyl chloride is removed in vacuo and to the residue are added 20 ml. of anhydrous benzene. Then 1.5 g. of n-butylamine are dropped slowly into the reaction mixture, which is stirred for 12 additional hours at room temperature. Subsequently, the solvent is distilled off and 4-ethylmercapto-1H-pyrazolo[3,4-b]pyridine-5 - N - butylcarboxamide crystallizes.

The following compounds are prepared by the procedure of Example 33 by substituting the appropriately substituted 4-hydroxy-1H-pyrazolo[3,4-b]pyridine-5-carboxylic acid ethyl ester in Part (c), the appropriate mercaptan in Part (e) and the appropriate amine in part g:

3. A compound as in claim 1 wherein $R_1$ and $R_3$ each is lower alkyl, $R_4$ is lower alkoxy, $R_2$ and $R_5$ each is hyro-

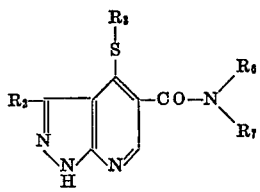

| Example | $R_2$ | $R_3$ | $N\begin{smallmatrix}R_6\\R_7\end{smallmatrix}$ |
|---|---|---|---|
| 34 | H | $CH_3-CH_2-$ | $-N(C_2H_5)_2$ |
| 35 | $CH_3$ | $CH_3-$ | $-NH-CH(CH_3)_2$ |
| 36 | ⟨phenyl⟩ | $CH_3-CH_2-$ | $-NH-(CH_2)_3CH_3$ |
| 37 | H | $CH_3-CH_2-CH_2-CH_2-$ | $-NH-CH_3$ |
| 38 | $CH_3$ | $(CH_3)_2CH-CH_2-CH_2-$ | $-NH-CH_2-CH_3$ |
| 39 | $CH_3$ | $CH_3-(CH_2)_6-$ | $-N(C_2H_5)_2$ |
| 40 | ⟨phenyl⟩ | $CH_3-CH_2-$ | $-N\underset{}{\underbrace{\phantom{xx}}}O$ |
| 41 | H | $CH_3-$ | $-NH-(CH_2)_3CH_3$ |
| 42 | H | $CH_3-CH_2-$ | $-N\underset{S}{\underbrace{\phantom{xx}}}$ |
| 43 | H | $(CH_3)_2CH-$ | $-N\underset{S}{\underbrace{\phantom{xx}}}$ |
| 44 | $CH_3$ | $CH_3-$ | $-N\underset{S}{\underbrace{\phantom{xx}}}N-H$ |
| 45 | H | $CH_3-CH_2-$ | $-N\underset{S}{\underbrace{\phantom{xx}}}N-CH_3$ |
| 46 | H | $CH_3-CH_2-CH_2-$ | $-N\underset{S}{\underbrace{\phantom{xx}}}N-CH_2-CH_2-OH$ |
| 47 | $CH_3$ | $CH_3-CH_2-$ | $-N\underset{S}{\underbrace{\phantom{xx}}}$ |

What is claimed is:
1. A compound of the formula

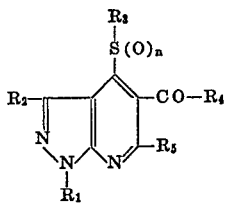

wherein $R_1$ is hydrogen, lower alkyl, phenyl, benzyl, cyclopentyl or cyclohexyl, $R_2$ is hydrogen, methyl or phenyl, $R_3$ is hydrogen only when $n$ is 0, lower alkyl, phenyl or benzyl, $R_4$ is hydroxy, lower alkoxy, lower alkyl, phenyl or the group

wherein $R_6$ and $R_7$ each is hydrogen, lower alkyl or hydroxy-lower alkyl, $R_5$ is hydrogen, lower alkyl or phenyl and $n$ is 0, 1 or 2,
and physiologically acceptable salts thereof.

2. A compound as in claim 1 wherein $R_1$ is hydrogen or lower alkyl, $R_2$ is hydrogen or methyl, $R_3$ is hydrogen, $R_4$ is hydroxy, lower alkoxy, lower alkyl, phenyl or lower alkylamino, $R_5$ is hydrogen or methyl and $n$ is 0 or 2.

gen an $n$ is 0.

4. A compound as in claim 3 wherein each lower alkyl group is ethyl and the lower alkoxy group is ethoxy.

5. A compound as in claim 1 wherein $R_1$ is ethyl, $R_2$ and $R_3$ each is methyl, $R_4$ is ethoxy, $R_5$ is hydrogen and $n$ is 2.

6. A compound as in claim 1 wherein $R_1$ is lower alkyl, $R_2$, $R_3$ and $R_5$ each is hydrogen, $R_4$ is lower alkoxy and $n$ is 0.

7. A compound as in claim 6 wherein the lower alkyl group is ethyl and the lower alkoxy group is ethoxy.

8. A compound as in claim 1 wherein $R_1$ is ethyl, $R_2$, $R_3$ and $R_5$ each is hydrogen, $R_4$ is hydroxy and $n$ is 0.

References Cited

UNITED STATES PATENTS 3,629,271   12/1971   Hoehn _____ 260—295.5 B

OTHER REFERENCES

Lowy et al., "An Introduction to Organic Chemistry," 6th ed., Wiley Publishers, p. 214, QD 253 L88 (1945).

Roberts et al.: "Basic Principles of Organic Chemistry," Benjamin Publishers, pp. 750, 756 and 806 (1965) QD 251 R 58 C.2.

ALAN L. ROTMAN, Primary Examiner

U.S. Cl. X.R.

260—243 B, 247.1, 268 BC, 293.6, 295.5 B; 424—246, 248, 250, 266, 267